United States Patent [19]

Emonet

[11] 4,265,322
[45] May 5, 1981

[54] COMPRESSED AIR FEED CONTROL SYSTEM FOR A TAPPING DEVICE

[75] Inventor: Henri Emonet, Montbrison, France
[73] Assignee: Maco-Meudon, Saint Priest, France
[21] Appl. No.: 943,912
[22] Filed: Sep. 19, 1978
[51] Int. Cl.³ .............................................. B23B 45/04
[52] U.S. Cl. .................................................... 173/169
[58] Field of Search ................ 173/168, 169, DIG. 2; 251/298

[56] References Cited

U.S. PATENT DOCUMENTS

| | | |
|---|---|---|
| 2,666,978 | 1/1954 | Skillman ........................ 173/169 X |
| 3,043,274 | 7/1962 | Quackenbush .................. 173/169 X |
| 3,666,027 | 5/1972 | Sauerwein et al. ................ 173/169 |
| 3,811,514 | 5/1974 | Bomberg et al. .................. 173/169 |
| 3,934,657 | 1/1976 | Danielson ......................... 173/169 |
| 3,970,110 | 7/1976 | Schaedler et al. .............. 173/169 X |

FOREIGN PATENT DOCUMENTS 605044  9/1978  Switzerland ................... 173/DIG. 2

*Primary Examiner*—Ronald Feldbaum
*Attorney, Agent, or Firm*—Remy J. VanOphem

[57] ABSTRACT

The invention is a unique air inlet control system for a distributor of a jack-hammer wherein the inlet control valve is mounted in the inlet passage so as to be pivotally movable by a sliding rod which is in intimate contact with the control trigger mounted in the handle as well as the valve body. The arrangement permits any force that is applied to the control trigger to be translocated to the valve body and thereby unseat the valve body. Further, when the force is removed from the control trigger, the compressed air acts on the sliding rod to allow the valve body to return to a sealed position.

7 Claims, 7 Drawing Figures

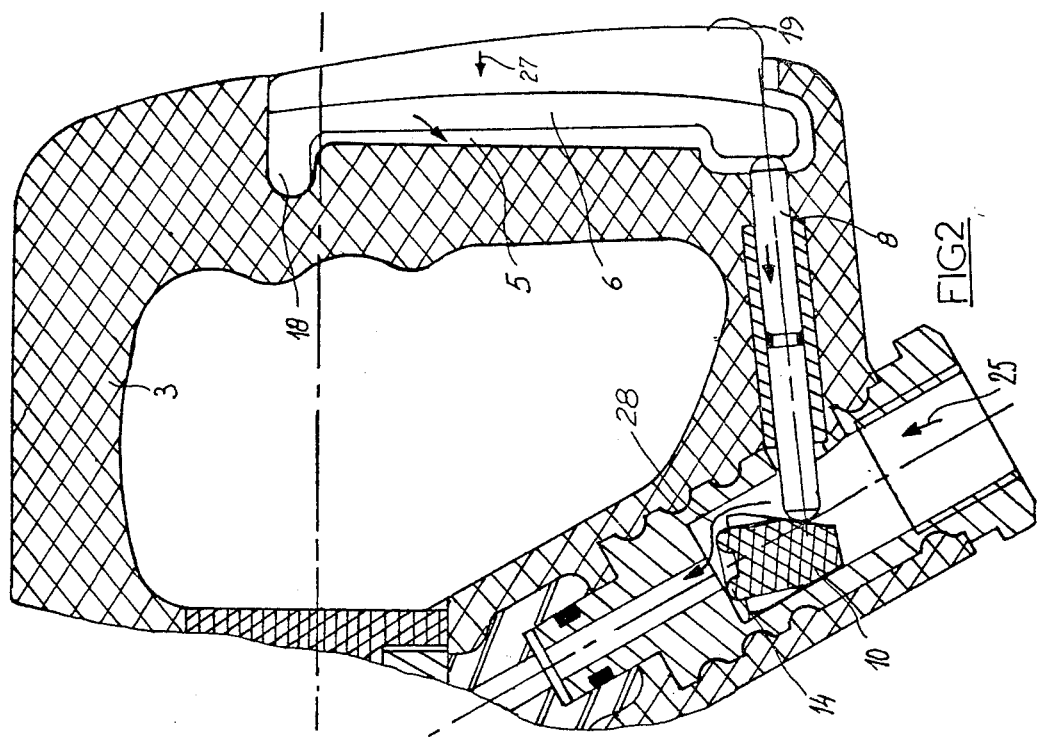
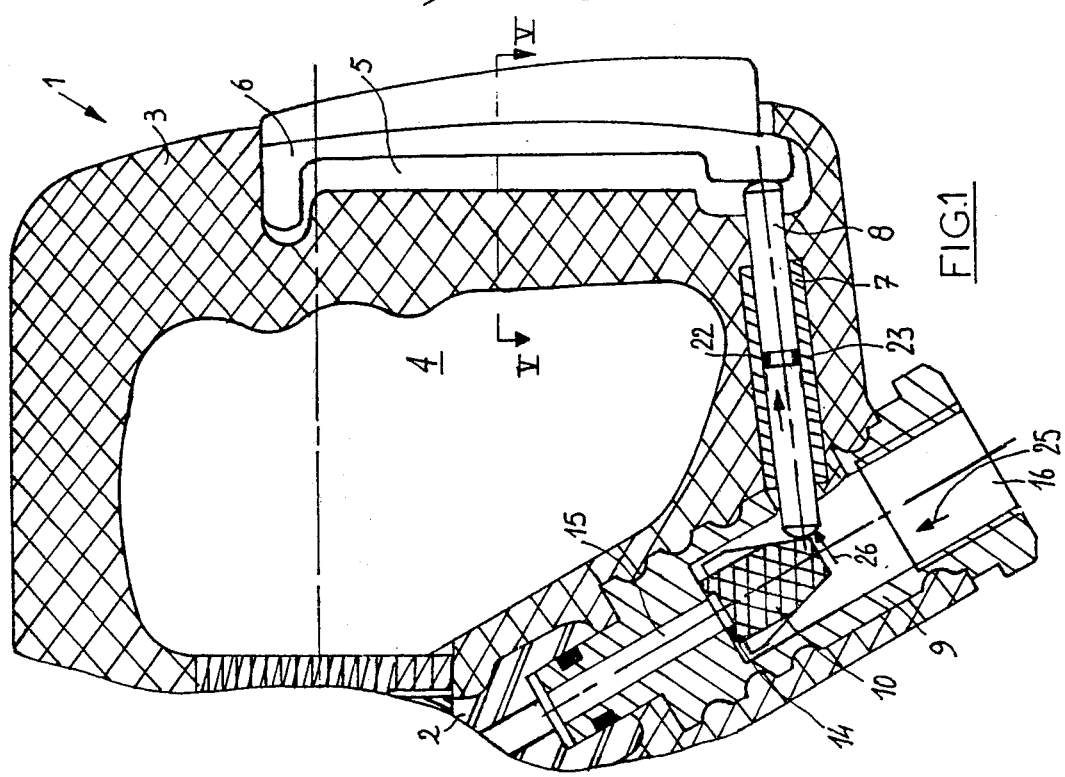

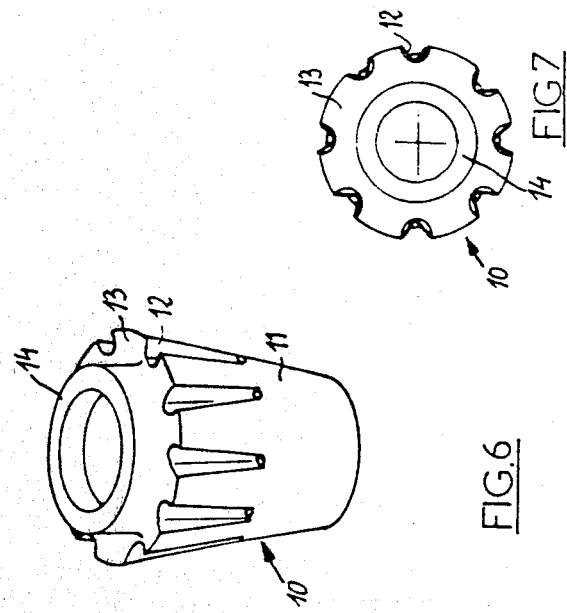
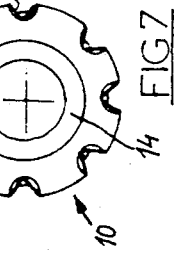
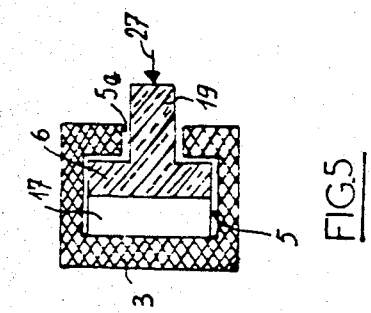

COMPRESSED AIR FEED CONTROL SYSTEM FOR A TAPPING DEVICE

BACKGROUND OF THE INVENTION

The present invention concerns a jack-hammer or concrete-breaking jack-hammer including a handle made of a relatively resilient material. It relates more particularly to the compressed air inlet control system of the distributor of the tapping or drilling device.

Usually, this type of equipment including a rubber, elastomer or similar handle, offer the advantage of significantly reducing the vibrations and shocks transmitted to the hand of the operator, thanks to the shock absorbing ability of the handle material. The compressed air inlet control system should be mounted in the handle, which is often built by molding. The popular control systems include a trigger, jointed on the handle and activating the inlet valve. The installation of the trigger and air system complicates the molding, particularly in the event that the mechanism has to be disassembled.

The present invention suppresses this inconvenience by constructing a simpler, inexpensive and more reliable control system.

SUMMARY OF THE INVENTION

According to the invention, the compressed air distributor inlet system of a jack-hammer type equipment, features a profiled control trigger, press-fitted in a recess provided a in resilient handle of the equipment; this trigger, including guiding and positioning protrusions as well as an extension to activate a pivoting valve is made of a light relatively soft plastic material. The valve is located in a compressed air inlet tubing, so as to shut the distributor inlet tubing, thereby closing the distributor inlet when activated by air pressure only.

The control trigger is not jointed on an element of the handle. It is directly molded.

The valve is trunconical. Its widest base rests against the inlet hole of the restricted piping. This base may include peripheral, axial grooves.

The trigger and the side wall of the valve interactivate one another through a rod sliding in a ring or insert recast in the handle.

This system is of the double-acting type:

when the trigger is pulled, the sliding rod moves the valve which, in turn, pivots on its side; the lip of its wide base uncovers the piping hole and the compressed air enters the distributor of the equipment;

when the trigger is released, the air pressure brings the valve back in closed position and pushes on the end of the sliding rod (tightly mounted). The pressure being transmitted to the trigger which is automatically retracted.

BRIEF DESCRIPTION OF THE DRAWINGS

The attached drawing, given as a non-exhaustive example, gives a better idea of the many features of the invention.

FIG. 1 is a section of the handle of a device equipped with a control system built according to the invention.

FIG. 2 is a view similar to FIG. 1 and shows the system after fitting of the trigger.

FIG. 4 is a section in the direction of arrows V—V of FIG. 1.

FIG. 6 is a view of a desirable construction of the pivot valve.

FIG. 7 is a front view of the pivot valve.

DETAILED DESCRIPTION OF THE PREFERRED EMBODIMENT

Figure 3:
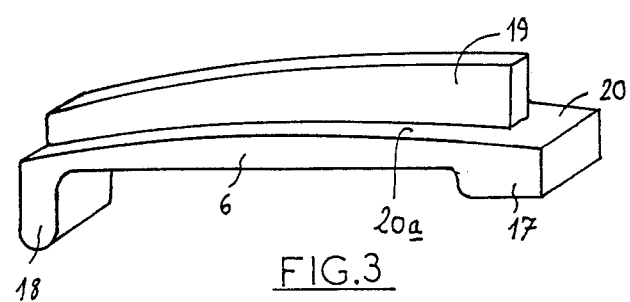
FIG. 3 is a view showing a possible profile of the trigger.
Figure 4:
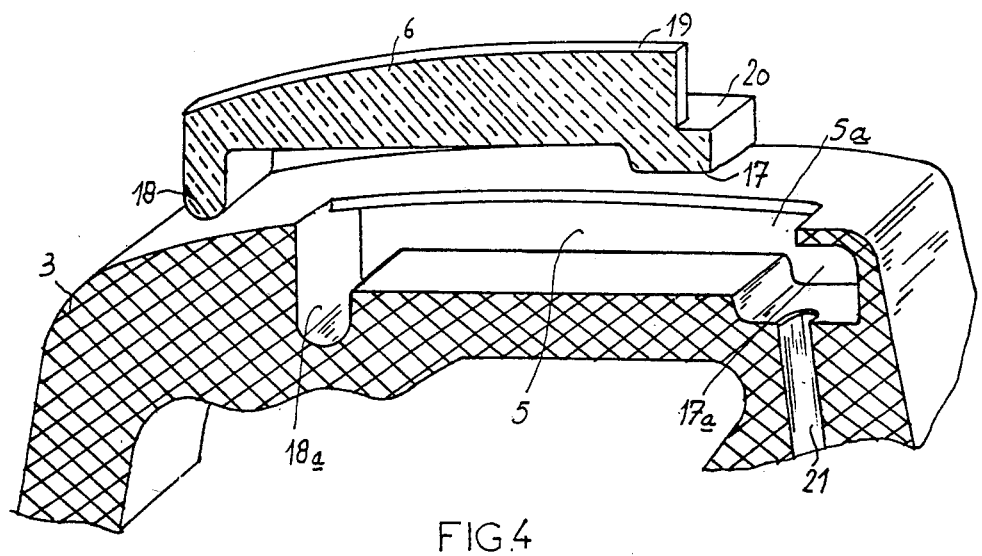
FIG. 4 is a trigger and rubber handle section, at the level of the trigger housing.

FIG. 1 shows a complete system, according to the invention, for the compressed air feeding control of the distributor 2 of a jack-hammer 1 activated by a handle 3 made of a rubber or shock absorbing and resilient material (elastomer for instance). A cavity 4 is provided upon molding of the handle which also includes:

a rear housing 5, for the profiled control trigger 6 showing in detail in FIG. 3 and 4;

a tubular insert 7 supporting a detachable sliding rod 8 which crosses the handle from the housing 5 to a compressed air inlet tubing.

The invented system also includes a valve 10, inserted in the tubing 9. This valve, which is shown in FIGS. 6 and 7, is made of a slightly resilient, plastic material, such as a polyamid or a polyurethane.

It includes:

one trunconical solid body 11;

axial grooves 12 provided in the widest front part of the body, these grooves being located in the side wall of the body 11;

in front of the body a large diameter base 13, a relatively narrow circular lip, this lip 14 includes an outside diameter larger than that of the passage leading to the compressed air distributor 2, the passage 15 including a bore whose diameter is smaller than the diameter of the bore 16 of the tubing 9 (FIG. 1, 6 and 7).

The control trigger is shown in detail on FIGS. 3 and 4. It includes:

an elongated body 6, molded and made of a solid material, an extension 17 and a protrusion 18 respectively protruding on the bottom part of the body, on both ends of the body (FIG. 3) and rigidly mounted on the same body.

at the time of the molding, on the rear or back of the trigger, an elongated bossing 19 narrower than the body 6 and roughly located at the center of the trigger width (FIG. 3 and 5) is provided to define two contact surfaces (or counterbores), 20 and 20a.

The rear recess 5 of the handle is made of a resilient material and has a shape which is an approximate compliment to the trigger shape, as illustrated on FIGS. 1, 2 and 4. It should be noted that this recess opens on the back of the handle, in an elongated hole 5a, narrower than the trigger body but wider than the bossing 19 of FIG. 5. Furthermore, the depth of the recess 5 exceeds the thickness of the trigger, so as to allow the back and forth movement of the latter.

As shown in FIG. 4, the sliding rod which transmits the control is inserted through the opening 5a in a hole 21 of the elastomer handle. This hole 21 communicates with the inside diameter of the tubular metal (brass) insert 7 and opens, on its opposite end inside the tubing 9, at the level of the valve 10 as clearly shown in FIG. 1.

With reference to FIGS. 1 and 4, the various components of the compressed air feeding system are installed in the following manner:

insert the sliding rod 8 equipped at half length, with a seal 22 mounted in a groove 23; the rod is inserted through opening 5a;

in the air inlet tubing, insert the plastic valve 10 so that its front lip comes to rest on the counterbore of the restricted air system, between the upper bore 16 and the lower bore 15; the maximum diameter of this valve is slightly smaller than the diameter of the bore 16;

finally, push the rod 8 until its front end is stopped by the side wall of the valve which is thus pivoted against the wall of the tubing 9.

the rear end of the rod 8 being out of the recess 5, it is then possible to mount the control trigger 6, in the fashion illustrated on FIGS. 1, 4 and 5. This operation is a "press mounting" made possible by the resiliency of the edges which partially shunt the housing 5 on three sides at least.

As the trigger 6 is installed in its handle housing, its internal bossings 17 and 18 locate inside the additional housing 17a and 18a. FIG. 4, and the external elongated boss 19 extends beyond the handle outside periphery. Furthermore, the sliding rod 8 is in contact, by its longitudinal ends, with the wall of the valve on one side, and with the bottom face of the trigger extension 17 on the other side.

Of course, the above construction is but an example. This document does not limit the type of construction of the control trigger and its housing in the handle, or of the pivoting valve.

The operation, illustrated on FIGS. 1 and 2, is as follows:

(a) after having installed all of the components, open the compressed air inlet in tubing 9. The valve 10 is subjected to a pressure defined by the arrow 25;

(b) assuming that at the beginning the operator does not push on the trigger 6, the valve 10 and the internal end of the rod 8 are only subjected to the pressure 25 so that;

the forward edge of the slightly resilient lip 14 is pressed against the restricted opening of the passage 15; the lip 14 presses flat and provides an excellent air seal (the seal 22 fills the same function between the insert 7 and the sliding rod 8);

the rod 8 is pushed to the rear (arrow 26, FIG. 1); its external edge, resting against the edges surrounding the opening 5a of the housing 5; the trigger is then in the off position illustrated on FIG. 1, the "return" function being performed by the air pressure.

(c) as the operator pushes the trigger inside the housing 5, the front embossment 18 first penetrates in the respective recess 18a, whereas the extension 17 remains slightly backward, since the opposite force created by the air pressure on the rod opposes (or can delay) the penetration of this extension (FIG. 4).

As the operator keeps pushing in the direction shown by arrow 27 on the rear elongated embossment 19, the handle causes the trigger assembly, and extension 17 in particular, to pivot slightly and penetrate further. The rod 8 moves toward the inside of the tubing 9 and causes the valve 10 to pivot. The trunconical body 11 comes to rest against the generating line of 9, opposite to hole 21. This pivoting action overcomes the tightness of the lip 14 and the air may then flow to the distributor (FIG. 2) following the arrow 28.

As the pressure is released from the control trigger, the air pressure causes th system to return automatically to its starting position as explained above and, as illustrated on FIG. 1.

This control system offers some obvious advantages, among which are:

an improved reliability of the system which no longer requires a trigger pivot pin or a return spring, and where the valve constitutes, by itself, its own seal;

at the same time, the lower cost of this control system made of two castings (the trigger and the valve) and of a rod that includes a seal (O-ring for instance);

the easy and quick assembly of the components; for instance, the valve is accurately positioned by the air flow around its peripheral, axial grooves, and the installation of the trigger which is made easier by the resiliency of the edges of its housing in the handle.

the possibility of using the equipment regardless of its orientation, the pressure of the compressed air being sufficient to hold the valve, made of a light material are further advantages.

Futhermore, the movement (pivoting) of the valve suppresses the need for a guiding and lubricating system; the trigger and the valve being mounted with an end play, prevent sticking or wedging, and the tightness of the system is excellent.

What I claim is:

1. A compressed air distributor system utilizing a source of compressed air for powering hand operated air equipment, said distribution system comprising:

a handle housing having a first passage and a recessed portion;

an annular member mounted coaxially in said first passage, said annular member having a second passage therethrough and means for sealing said first passage;

pivot valve means sealingly mounted in said second passage for selectively opening and closing said second passage;

said pivot valve means further comprising a valve body having a trunconical outer configuration with a central counterbore, said valve body further having a base diameter at one end and a reduced diameter at the opposite end with a circular lip extending axially in one direction from said base diameter and located concentric to said central counterbore, said circular lip defining a valve seat, said trunconical outer configuration further having axial grooves radially spaced and beginning at said base diameter and extending in an opposite direction toward said reduced diameter, said valve body further being mounted in said second passage of the annular member for selectively opening and closing said second passage;

control means mounted in said recessed portion, said control means being mounted in said recessed portion to move from a predetermined first position to a predetermined second position;

means for translocating interposed said pivot valve means and said control means, said translocating means further being mounted in intimate contact with said control means and said pivot valve means such that when said control means is at said predetermined first position, said translocation means communicates with said pivot valve means to seal said first passage, and when said control means is at said predetermined second position, said translocation means communicates with said pilot valve means to open said first passage means permitting said source of compressed air to pass to the distributor.

2. A compressed air distribution system utilizing a source of compressed air for powering hand operated air equipment, said distribution system comprising:
   a handle housing comprising a first portion having first passage means and a second portion having a recessed cavity;
   an elongated tubing member mounted in said first passage means of the handle housing, said tubing member further comprising:
      a central passage having a counterbore at one end thereof;
      a shoulder interposed said counterbore and the opposite end of the central passage; and
      means for mounting said tubing member in said first passage means;
   first means for sealing said central passage of the tubing member, said sealing means being pivotally mounted against said shoulder in said counterbore;
   second means for sealing said tubing member in said first passage means interposed said tubing member and said first portion of the housing;
   an elongated control trigger member movably mounted in said recessed cavity of the handle housing; said elongated control trigger member being movable from a predetermined first direction to a predetermined second direction; and
   translocation means slidably mounted in said handle housing, said translocation means being in intimate contact with said elongated control trigger member and said means for sealing said central passage, said translocation means movable with said control trigger member from a predetermined first position sealing said central passage to a predetermined second position unsealing said central passage.

3. The distribution system as claimed in claim 2 wherein said control trigger member further comprises:
   a contact surface along the entire length of said member having one end and an opposite end;
   an elongated boss extending from said contact surface in one direction;
   a protrusion extending from said contact surface at said one end in an opposite direction; and
   an extension extending from said contact surface at said opposite end in an opposite direction.

4. The distribution system as claimed in claim 2 wherein said translocation means further comprises:
   second passage means located in said handle housing having one end opening into said recessed cavity and an opposite end opening into said first passage means;
   a tubular insert member mounted in said passage;
   a rod member slidably mounted in said tubular insert, said rod member having one end extending into said recessed cavity in intimate contact with said control trigger member, said rod member further having an opposite end extending into said first passage means and further being in intimate contact with said first means for sealing said central passage; and
   means for slidably sealing said rod member in said tubular insert such that compressed air supplied to said first passage means acts on said rod member to move said rod member in predetermined first position.

5. The distribution system as claimed in claim 2 wherein said first means for sealing said central passage further comprises a valve body having a trunconical outer configuration with a central counter bore, said valve body further having a base diameter at one end and a reduced diameter at the opposite end with a circular lip extending axially in one direction from said base diameter and located concentric to said central counter bore, said circular lip defining a valve seat, said trunconical outer configuration further having axial grooves radially spaced and beginning at said base diameter and extending in an opposite direction towards said reduced diameter, said valve body further being mounted in said counterbore of the elongated tubing member with said circular lip adjacent said shoulder portion to seal said central passage when a source of compressed air is present in the counterbore.

6. The distributor system as claimed in claim 2 wherein said second means for sealing said tubing member comprising:
   an axial groove located in the outer periphery of the tubing member; and
   a sealing member mounted in said groove such that when said tubing member is assembled into said first passage means said sealing member and said first sealing means cooperate to seal said first passage means.

7. The distributor as claimed in claim 3 wherein said housing further comprises:
   elongated opening in the periphery of the housing adapted to receive said elongated boss of the control trigger member, said recessed cavity further having a first depression adapted to receive said protrusion of the control trigger member and a second depression adapted to receive said extension of the control trigger member; and
   a passage having one end terminating in said second depression of the cavity and an opposite end terminating in said first passage means.

* * * * *

UNITED STATES PATENT OFFICE
CERTIFICATE OF CORRECTION

Patent No. 4,265,322                    Dated    May 5, 1981

Inventor(s)    Henri Emonet

It is certified that error appears in the above-identified patent and that said Letters Patent are hereby corrected as shown below:

Column 1, line 32, delete the words "a in" and insert ----in a----.

Column 1, line 34, after the word "valve" insert a coma.

Column 2, line 3, delete the numeral "4" and insert the numeral ---5---.

Column 2, line 19, delete "showing" and insert ----shown----.

Column 3, line 24, after the numeral "18a" delete the period and insert ----, of----.

Column 4, line 4, after the word "causes" delete "th" and insert ----the----.

Signed and Sealed this

Twenty-ninth Day of September 1981

[SEAL]

Attest:

Attesting Officer

GERALD J. MOSSINGHOFF

Commissioner of Patents and Trademarks